(12) United States Patent
Reed et al.

(10) Patent No.: US 10,007,729 B1
(45) Date of Patent: Jun. 26, 2018

(54) COLLABORATIVELY FINDING, ORGANIZING AND/OR ACCESSING INFORMATION

(75) Inventors: Mark William Reed, Fort Thomas, KY (US); Sundaresan Ramachandran Kadayam, Blue Ash, OH (US)

(73) Assignee: Zakta, LLC, Cincinnati, OH (US)

( * ) Notice: Subject to any disclaimer, the term of this patent is extended or adjusted under 35 U.S.C. 154(b) by 442 days.

(21) Appl. No.: 13/207,085

(22) Filed: Aug. 10, 2011

Related U.S. Application Data

(63) Continuation-in-part of application No. 12/692,117, filed on Jan. 22, 2010.

(60) Provisional application No. 61/146,967, filed on Jan. 23, 2009, provisional application No. 61/372,688, filed on Aug. 11, 2010.

(51) Int. Cl.
   *G06F 17/30* (2006.01)

(52) U.S. Cl.
   CPC .............................. *G06F 17/30864* (2013.01)

(58) Field of Classification Search
   CPC ................... G06F 17/30864; G06Q 17/30613
   USPC ............... 707/707, 708, 719, 736, 752, 781
   See application file for complete search history.

(56) References Cited

U.S. PATENT DOCUMENTS

| | | | |
|---|---|---|---|
| 7,536,386 B2* | 5/2009 | Samji et al. | |
| 2002/0165856 A1* | 11/2002 | Gilfillan et al. | 707/3 |
| 2005/0149538 A1* | 7/2005 | Singh | G06F 17/30893 |
| 2007/0027811 A1* | 2/2007 | Jackson et al. | 705/52 |
| 2007/0043742 A1* | 2/2007 | Arguello et al. | 707/100 |
| 2008/0306924 A1* | 12/2008 | Paolini | G06F 17/30026 |
| 2009/0055355 A1* | 2/2009 | Brunner et al. | 707/3 |
| 2009/0307205 A1* | 12/2009 | Churchill et al. | 707/5 |

\* cited by examiner

*Primary Examiner* — Syling Yen
*Assistant Examiner* — Soheila (Gina) Davanlou
(74) *Attorney, Agent, or Firm* — Frost Brown Todd LLC

(57) ABSTRACT

Methods, systems, devices and/or apparatus related to finding and sharing information on a large-scale or global computer network such as the Internet, and, specifically, to allow for collaboratively searching for, organizing and/or accessing information. One example provides computer-readable medium(s) having instructions thereon configured to operate a network accessible computer system to: receive a search query; generate search result data from processing the search query through at least one search engine; generate a collaborative search portal associated with the search query; receive one or more instructions for associating at least one of the search result data with the collaborative search portal; associate the at least one of the search result data with the collaborative search portal; store, in one or more storage devices, the collaborative search portal and the associated search result data; and organize the search result data in response to user signals received via the collaborative search portal.

6 Claims, 16 Drawing Sheets

COLLABORATIVELY FINDING, ORGANIZING AND/OR ACCESSING INFORMATION

CROSS-REFERENCE TO RELATED APPLICATIONS

This application is a Continuation-In-Part of U.S. patent application Ser. No. 12/692,117, entitled "Topical Search Portal," filed on Jan. 22, 2010, which claims priority to U.S. Provisional Patent Application Ser. No. 61/146,967, filed on Jan. 23, 2009, the contents of which are incorporated herein by reference in their entirety.

This application also claims the benefit of U.S. Provisional Application No. 61/372,688, entitled "System for collaboratively searching for information," filed on Aug. 11, 2010, the disclosure of which is incorporated herein by reference.

BACKGROUND

The Internet has become a primary repository of knowledge, but the sheer volume of information has created a need to find and organize the digital information available ("digital curation"). Furthermore, many business and consumer uses of the Internet require collaboration based on this information. Many tools have been applied to the need.

Traditional web search allows an individual to find candidate results across the wide array of web information. Traditional web search engines have made it much easier to find information, but it is still a lonely process that does not allow for collaboration or organization of that data.

Wikis allow for collaborative editing of web documents, but are not integrated with the search process and require each user to provide their own content.

More recent social technology allows users to share information among users, but does little to facilitate group interaction within search in a trusted setting.

"Digital curation" continues to be a lengthy manual process where the search/research process is separated from the collaboration process. Current technology does not provide an integrated group search space suitable for collaboratively finding, organizing and/or accessing information.

SUMMARY OF THE DISCLOSURE

In a first aspect, computer-readable medium(s) may include instructions thereon configured to operate network accessible computer system(s). Such instructions may cause the network accessible computer system(s) to perform the steps of: receiving a search query over a computer network; generating search result data from processing the search query through search engine(s); generating a collaborative search portal associated with the search query; receiving instruction(s), over the computer network, for associating the search result data (or a portion thereof) with the collaborative search portal; associating the search result data with the collaborative search portal; storing, in storage device(s), the collaborative search portal and the associated search result data; and organizing the search result data in response to user signals received via the collaborative search portal.

In some examples, the instructions may further perform the steps of: receiving instruction(s), over the computer network, for generating folder(s) within the collaborative search portal, the folder(s) being associated with the search result data; generating the folder(s) within the collaborative search portal; receiving instruction(s), over the computer network, for associating the search result data (or a portion thereof) with at least one of the folder(s); and associating the search result data with at least one of the folder(s).

In some examples, the instructions may further perform the steps of allowing access to the collaborative search portal by user(s). In some examples, allowing access to the collaborative search portal may include allowing access, by the user(s), by allowing displaying, editing and/or deleting the collaborative search portal. In some examples, the user(s) may include public user(s), private user(s), authorized portal moderator(s), authorized portal administrator(s) and/or user group(s).

In some examples, the user(s) may include authorized portal moderator(s) and/or authorized portal administrator(s) having permission to display, edit and/or delete the collaborative search portal or information associated therewith. In some examples, a third party may have no permission to display, edit and delete the collaborative search portal. In some examples, a third party may have no permission to edit and/or delete the collaborative search portal. In some examples, the user(s) may include public user(s), where the public user(s) have permission to display, edit and delete the collaborative search portal. In some examples, the user(s) may include public user(s) and authorized portal moderator(s). In such examples, the public user(s) may have permission to display and edit the collaborative search portal and the authorized portal moderator(s) may have permission to display, edit and delete any edit performed by the public user(s).

In some examples, the user(s) may include a first user and a second user, and the first user may associate with the second user based on, at least in part, on the search result data. In some examples, the search query may be transmitted by a first user, and the instruction(s) for organizing the search result data may be transmitted by the first user and/or a second user.

In some examples, the instructions may further perform the steps of receiving instruction(s), over the computer network, for associating the collaborative search portal with a social network, and associating the collaborative search portal with the social network. In some examples, the instructions may further perform the step of publishing the collaborative search portal on the computer network for long-term access by users of the computer network. In some examples, the instructions may further perform the step of allowing access to the collaborative search portal by user(s). In some examples, prior to allowing access to the collaborative search portal by user(s), verifying that the user(s) have permission to access the collaborative search portal. In some examples, the instructions may further perform the steps of receiving instruction(s), over the computer network, to share at least a portion of the collaborative search portal with a third party over the computer network, and sharing the at least a portion of the collaborative search portal with the third party over the computer network.

In some examples, the search query may be transmitted by predetermined authorized user(s). In such examples, the instruction(s) for organizing the search result data may be transmitted by predetermined authorized user(s). In such examples, the collaborative search portal may be accessible to at least a portion of the predetermined authorized user(s). In some examples, the predetermined authorized user(s) may include public user(s), private user(s) and/or user group(s).

In some examples, the instructions may further perform the steps of receiving instruction(s) from a third party, over the computer network, for access to at least one of the search result data, and, prior to allowing access to the search result data, receiving a payment from the third party.

In some examples, the instructions may further perform the steps of receiving an instruction, over the computer network, to display an annotation, a message and/or a comment on the collaborative search portal, and displaying the annotation, the message and/or the comment on the collaborative search portal. In some examples, the annotation, the message and/or the comment may be transmitted by a first user, and may be accessible by a second user.

In some examples, the search engine(s) may include an electronic commerce database search engine and/or an education database search engine. In such examples, the user interface of the collaborative search engine may be tailored for an electronic commerce environment and/or and education environment.

In a second aspect, computer-readable medium(s) may include instructions thereon configured to operate network accessible computer system(s). Such instructions may cause the network accessible computer system(s) to perform the steps of: receiving a search query over a computer network; generating search result data from processing the search query through search engine(s); identifying a topical area related to the search query; generating a collaborative search portal associated with the topical area; inviting a first user to interact with the collaborative search portal; inviting a second user to interact with the collaborative search portal; receiving instruction(s), over the computer network, from the first user and/or the second user for associating at least one of the search result data with the collaborative search portal; receiving instruction(s), over the computer network, from the first user and/or the second user for generating folder(s) within the collaborative search portal, the folder(s) being associated with the search result data; and receiving instruction(s), over the computer network, from the first user and/or the second user for associating at least one of the search result data with at least one of the folder(s).

In some examples, the instructions may further perform the steps of storing, in storage device(s), the collaborative search portal and the associated search result data, and publishing the collaborative search portal on the computer for long-term access by user(s) of the computer network. In some examples, the instructions may further perform the steps of altering the collaborative search portal, the search result data and/or the folder(s) by an authorized portal administrator.

In some examples, altering the collaborative search portal, the search result data and/or the folder(s) may include displaying, editing and/or deleting the collaborative search portal, displaying, editing and/or deleting the search result data associated with the collaborative search portal, and/or displaying, editing and/or deleting the folder(s) associated with the collaborative search portal.

In a third aspect, computer-readable medium(s) may include instructions thereon configured to operate network accessible computer system(s). Such instructions may cause the network accessible computer system(s) to perform the steps of: receiving a search query from a first user over a computer network; generating search result data from processing the search query through search engine(s); generating a collaborative search portal associated with the search query; receiving instruction(s) from the first user, over the computer network, for associating at least a first one of the search result data with the collaborative search portal; associating the at least first one of the search result data with the collaborative search portal; receiving instruction(s) from a second user, over the computer network, for associating at least a second one of the search result data with the collaborative search portal; associating the at least second one of the search result data with the collaborative search portal; and storing, in storage device(s), the collaborative search portal and the associated search result data.

In some examples, the instructions may further perform the steps of receiving instruction(s) from the first user and/or the second user, over the computer network, for generating folder(s) within the collaborative search portal; generating the folder(s) within the collaborative search portal; receiving instruction(s) from the first user and/or the second user, over the computer network, for associating at least one of the search result data with at least one of the folder(s); and associating the at least one of the search result data with at least one of the folder(s).

In some examples, the instructions may further perform the steps of receiving instruction(s) from a third party, over the computer network, for access to the collaborative search portal, and, prior to allowing access to the collaborative search portal by the third party, receiving a payment from the third party. In some examples, the instructions may further perform the steps of receiving instruction(s) from a third party, over the computer network, for access to the collaborative search portal and topical expert(s) associated with the collaborative search portal, and, prior to allowing access to the collaborative search portal and the topical expert(s) associated with the collaborative search portal by the third party, receiving a payment from the third party.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
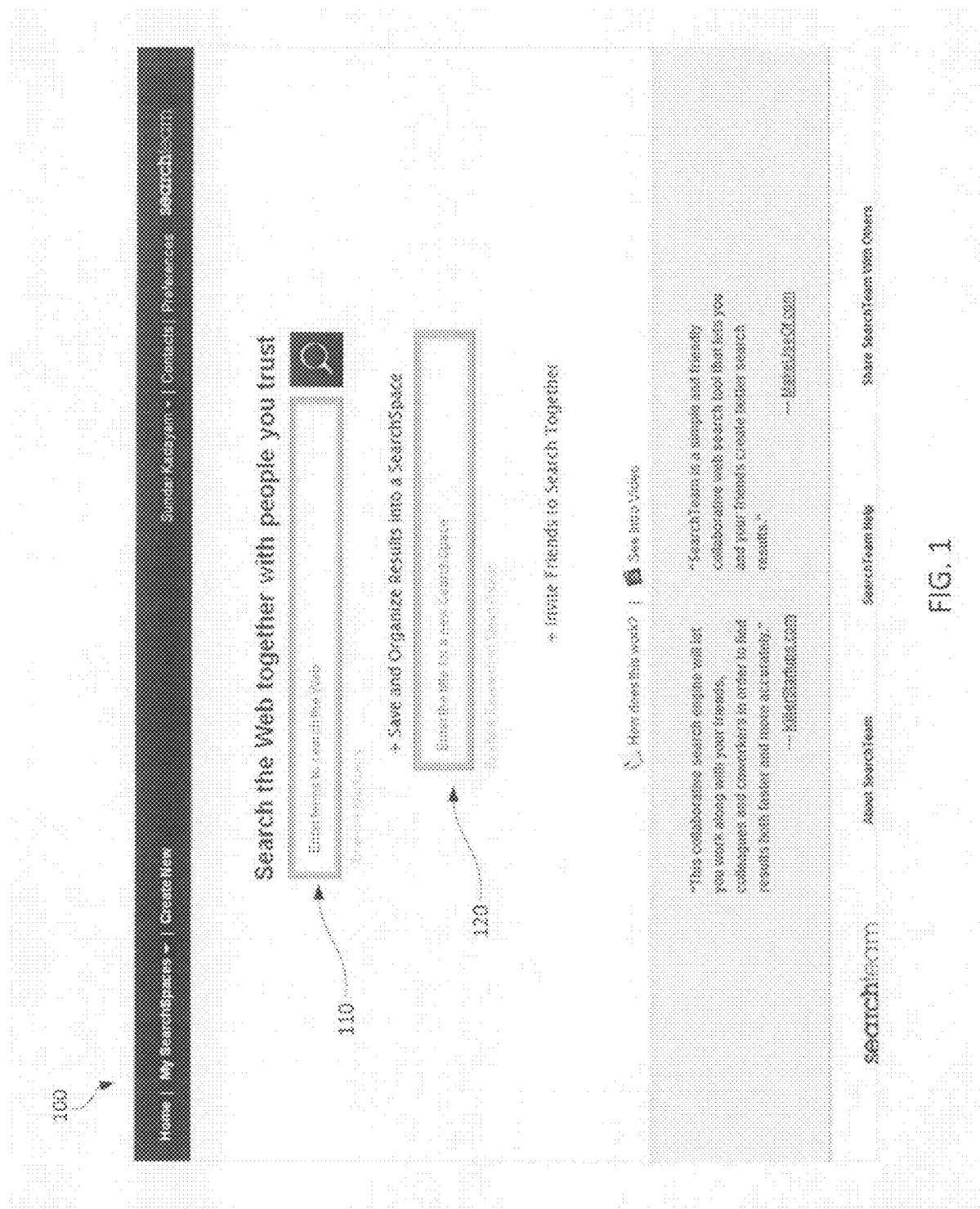
FIGS. 1-15 depict example screenshots illustrating aspects and examples of collaboratively finding, organizing and/or accessing information.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn to methods, systems, devices and/or apparatus related to finding and sharing information on a large-scale or global computer network such as the Internet. Specifically, the disclosed methods, systems, devices and/or apparatus relate to allow for collaboratively searching for, organizing and/or accessing information.

FIG. 1 depicts an example initial user interface (UI) 100 presented to a user. This example home page 100 provides a traditional search box 110 where users may enter a query like other traditional search engines as well as an area 120 to simultaneously create a SearchSpace on the query topic. The traditional search box 110 allows a search query to be input to retrieve search results. The SearchSpace area 120 allows a SearchSpace to be created and/or saved, including inputting a SearchSpace title.

In some examples, a user may create a SearchSpace on a topic. A SearchSpace defines a topical area upon which to search. SearchSpaces may be used for individual searching and organizing, but also may create a space to which others may be invited (e.g., a collaborative search portal). In some examples, a SearchSpace may exist within a website, but may also be deployed over any number of technologies or platforms (e.g., mobile devices). SearchSpaces and/or data associated therewith may be stored in traditional relational database(s) and/or in some other suitable storage mechanism. Example data storage for a SearchSpace and associated data is shown in Table I.

TABLE I searchspaces table ( 1 per searchspace )
searchspace name
searchspace description
user information ( who created when )
collaborators table ( with foreign key to searchspace table )
user name
permission
folders table ( with foreign key to the searchspaces table )
folder name
user information ( who created when )
items table ( with foreign key to the folders table )
item title
item text
item url
user information ( who created when )
comments table ( with foreign key to items, folders, and searchspace )
comment
user information ( who created when )
ratings table ( with foreign key to items, folders, and searchspace )
rating ( like, . . . )
user information ( who created when )
history table ( with foreign keys to items, folders, and searchspace )
action taken
user information ( who took action when )
groups table ( searchspaces can have a foreign key to a group if within a group )
group name
group members table ( with foreign key to groups table )
member
permission
hubs table ( groups can belong to a hub )
hub name For brevity, the present disclosure uses SearchSpace embodiments as example collaborative search portals. Other collaborative search portals are also contemplated.

Figure 2:
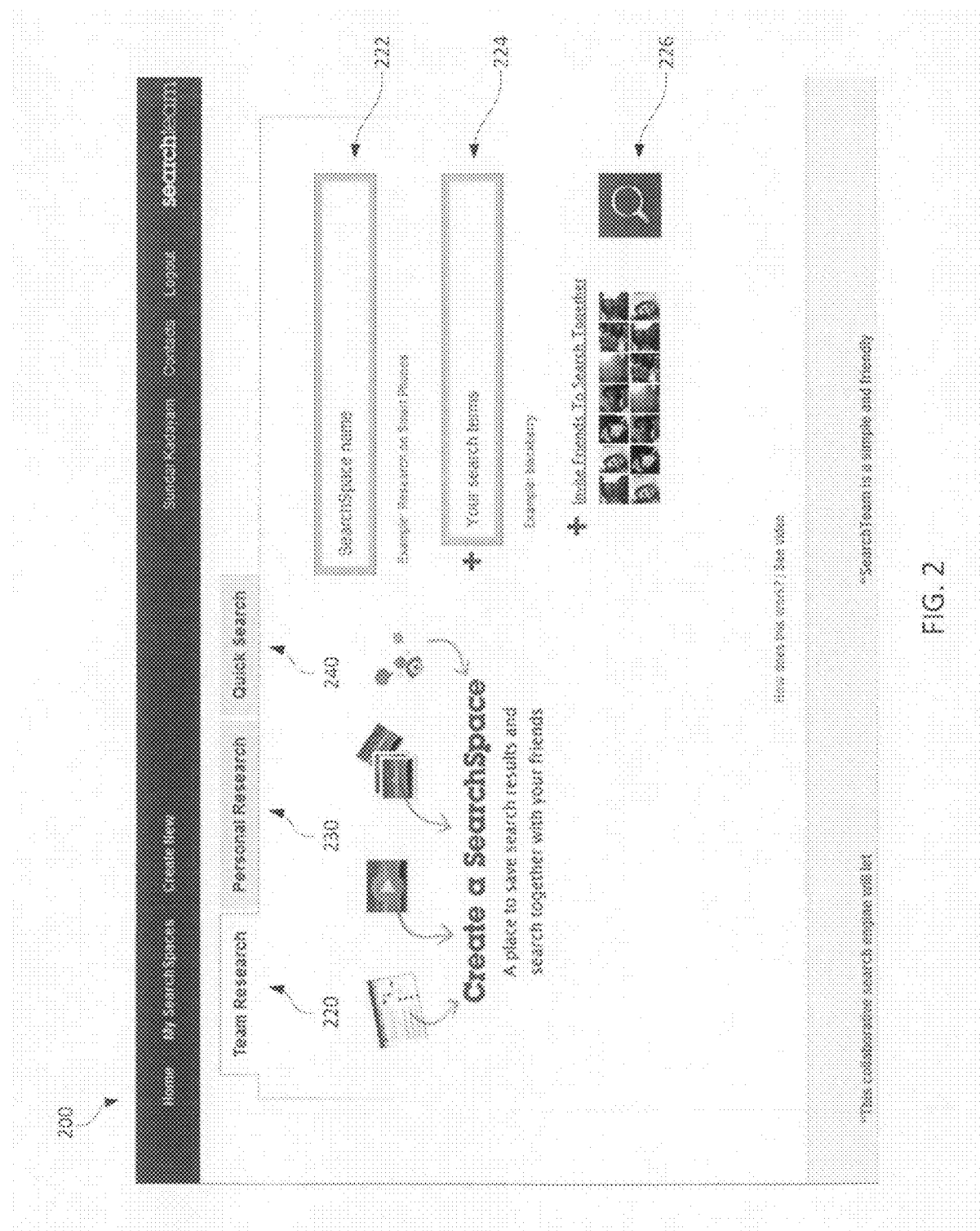

FIG. 2 depicts an example SearchSpace creation UI 200 that users may use to create a SearchSpace. This example UI 200 provides a tabbed interface 210 that allows users to access one or more search tools. Users may choose Team Research 220 and define a name 222 for a SearchSpace as well as the initial terms 224 used for searching and the people in the "team" who may collaborate. The tabbed page 210 may also allow for Personal Research 230 (e.g., search/research without collaborators) as well as Quick Search 240 (the traditional search engine experience).

Figure 3:
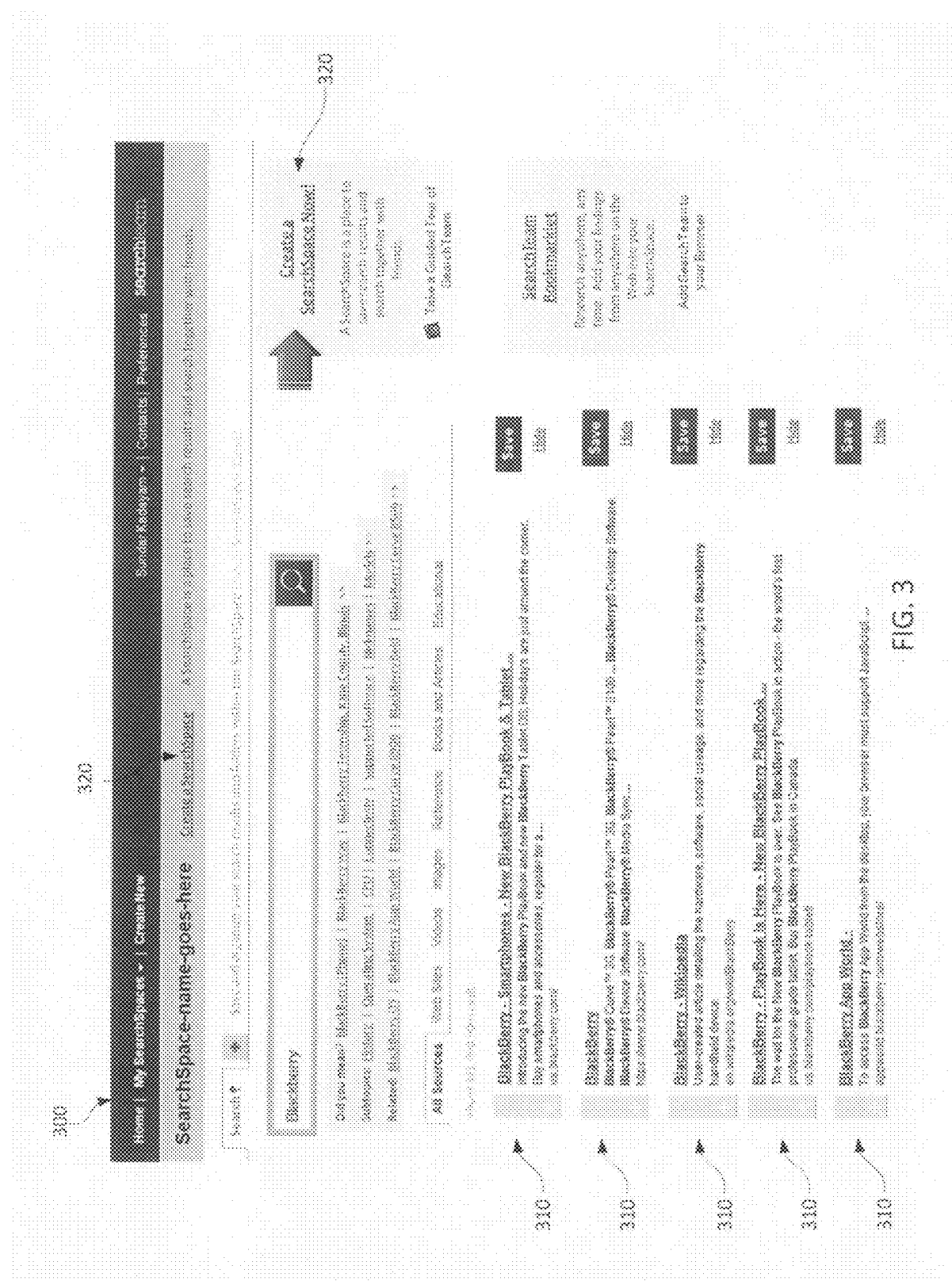

FIG. 3 depicts results of an example Quick Search UI 300. A Quick Search may be like a traditional search engine experience where the best items 310 matching a query are presented. In some examples, a Quick Search may be converted to a persistent SearchSpace by using links 320 in the header and/or right side area. This may allow a traditional search to easily become a persistent area for collaborative searching, organizing and/or accessing of information. A user may use a computer mouse, for example, to click on links 320 to initiate the creation of a SearchSpace.

Figure 4:
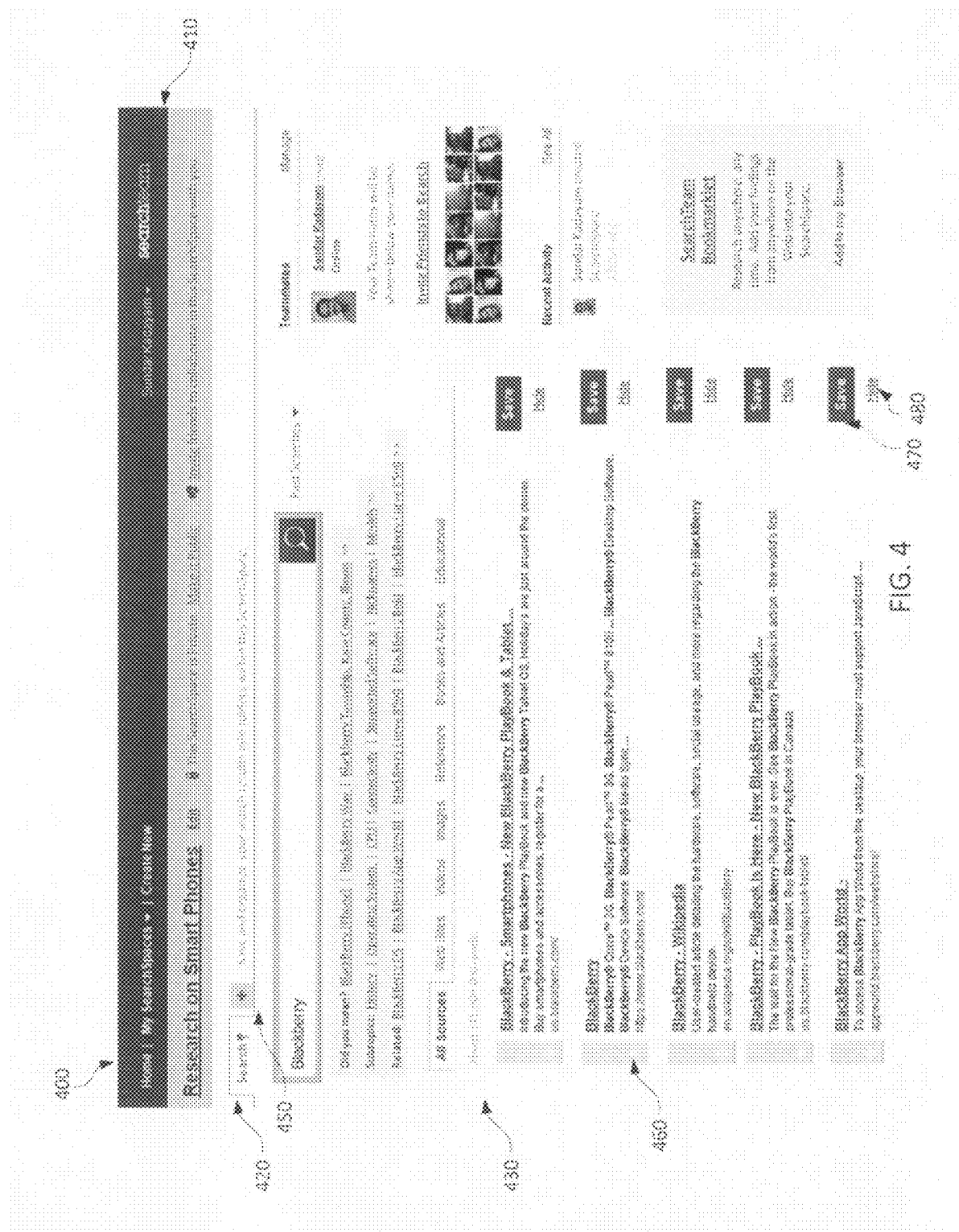

FIG. 4 depicts an example SearchSpace UI 400. Example SearchSpaces 400 may include a header 410 outlining the name and any relevant overall meta information (e.g., description, publication status). It may also include an area 420 of folders for organization, an area 430 for searching and displaying search results, and an area 440 for collaboration showing collaborators and their activity.

Example SearchSpaces may be intended to be an organized repository of all information relevant to the topic, regardless of location or format of such information. In some examples, one or more search results, links, websites, files, data and/or information may be associated with a SearchSpace. Searches may be performed on any number of data sources. Example data sources may include publicly available data sources (e.g., search engine databases) and/or other data sources (e.g., store databases, user databases, corporate databases, legal databases).

Associating search results and/or other data may occur in many ways. For example, a user may simply "save" search results to a SearchSpace by clicking a "Save" button within a SearchSpace. In some examples, users may also add files to folders (e.g., clicking an "add document" or "add file" button within a SearchSpace) to enable sharing of a user's existing files relevant to the topic. In some examples, when a user adds a file to a SearchSpace, the file may be viewed and/or edited by users other than the user who added the filed. In some examples, the actions associated with a file may be logged and versions of the file may be filed prior to and/or after each action related to the file occurs. This allows files to be saved in a manner in which a user's edits may be reverted to an earlier version of the file.

In some examples, a user may associate any link with a SearchSpace, even if the link does not appear in search results. If a user desires to add a link, the user may use a computer mouse, for example, to click an "add link" button. When clicked, the "add link" button may cause a pop-up window requesting information about the link to be added. A user may enter a link title, a link Uniform Resource Locator (URL), a thumbnail image (e.g., from a local image or from a linked image) to appear with the link in the SearchSpace, and/or any notes, annotations, summaries and/or or text (e.g., HTML or plaintext) to be displayed with the link in the SearchSpace. When a user desires to save the link to the SearchSpace, the user may click a save button within the pop-up window.

Some examples allow users to use browser add-ins to add any resources and/or references found through browsing the Web directly into their SearchSpaces. For example, a user may be browsing the Web and discover a blog post that may be relevant to a SearchSpace's topic. If the user desires to share this blog post on a SearchSpace, the user, via a browser add-in, may "drag" the link, "bookmark" the link or otherwise instruct the browser add-in to associate the blog post link with the specific SearchSpace.

An example browser add-in may allow a user to "click and drag" a link in a web browser to a visible browser add-in portion of the web browser. For example, if a user is viewing a website about sports, the user may desire to add a baseball story link on that website to his SearchSpace about baseball. In this example, the user may use a computer mouse to left-click the desired link to the story and navigate his mouse (while continuing to hold the left-click) to "drag" the link to an add-in area (e.g., an icon, a toolbar) within the web browser environment. This user may then release the left-click when the mouse is navigated over the add-in area. These example actions may automatically add the link to a predetermined SearchSpace (e.g., baseball SearchSpace) or prompt the user to identify with which SearchSpace the link should be associated.

An example browser add-in may allow a user to "bookmark" a link using a menu in a web browser environment. For example, if a user is viewing a website about p, the user may desire to add an online article about Labrador retrievers to his SearchSpace about Labrador retrievers. In this example, the user may use a computer mouse to right-click the desired link to the story and navigate his mouse to "bookmark" the link via a pop-up menu within the web browser environment. In some examples, a browser add-in may display a toolbar in the web browser environment. Such a toolbar may allow a user to left-click an icon on the toolbar to "bookmark" a web page, link and/or other data displayed in the web browser. These example actions may automatically add the link to a predetermined SearchSpace (e.g., Labrador retriever SearchSpace) or prompt the user to identify with which SearchSpace the link should be associated.

In some examples, users may add search results into folders, and further organize them with tags and other relevant metadata. Tags or other relevant metadata may be manually added by a user or may be automatically added in a SearchSpace. In some examples, a user may be given the option to add new textual tags or to choose tags from a list of pre-determined tags. For example, a user may manually associate a tag named "educational reference" (e.g., by adding a new tag or by choosing from a list of available tags) to an educational thesis related to a topic, while associating a tag named "editorial" to an editorial article related to the topic. In that example, the SearchSpace may automatically categorize the manually added "educational reference" tag as a "References" tag. Similarly, the SearchSpace may automatically categorize the manually added "editorial" tag as an "Opinion" tag.

Figure 9:
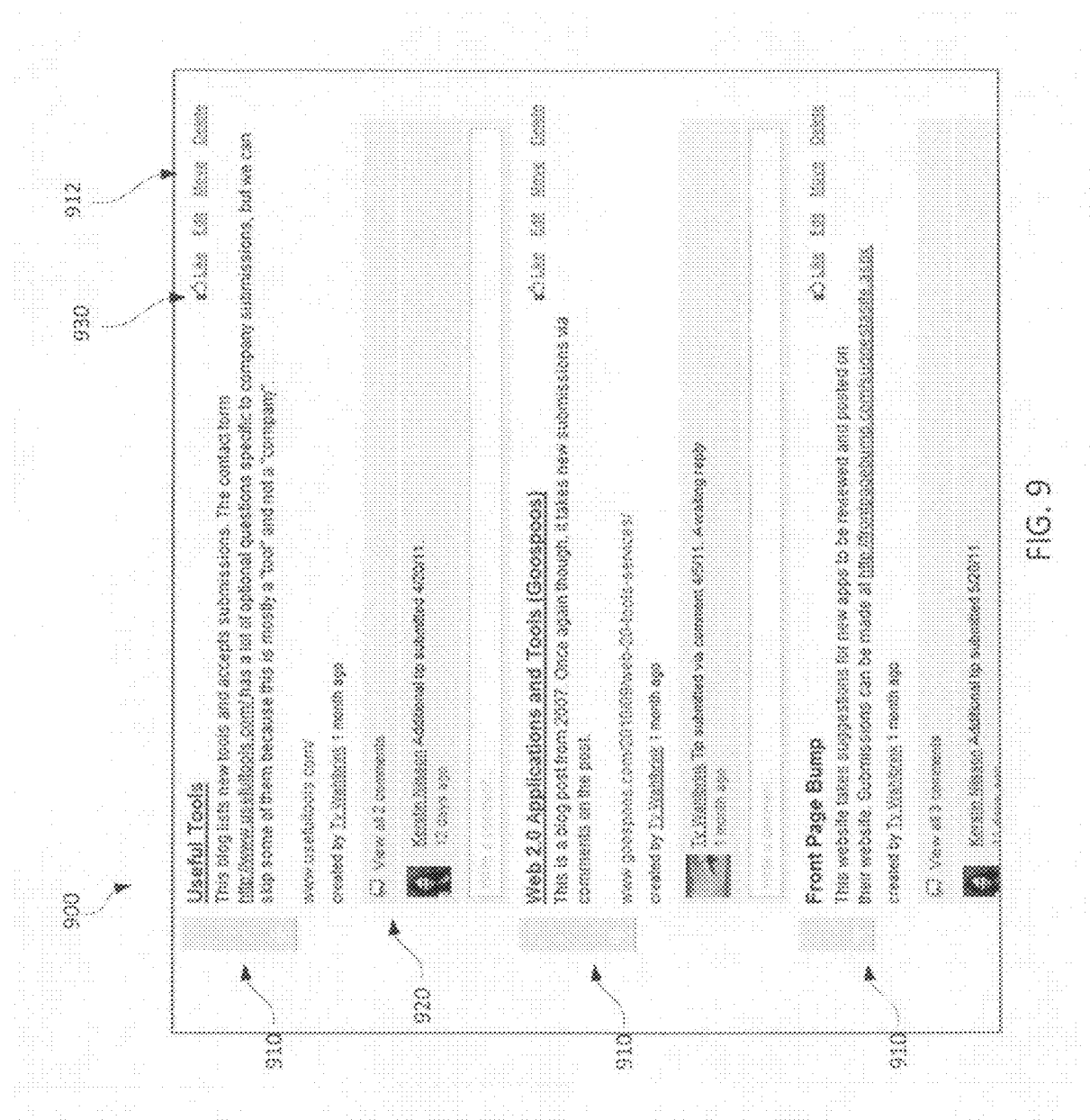

In some examples, users may compose annotations, notes, message, posts and the like, and add them to and/or associate them with folders to share tacit knowledge relevant to the topic (as discussed in relation to FIG. 9). For example, this allows a user to create notes about search results and/or communicate messages about search results to other users. For example, a user may add annotations, notes, message, posts and the like to a SearchSpace (or folders therein) by using a computer mouse, for example, to click on an "add post" button. The user may prompted by a pop-up window to input a post title and/or a post text (e.g., HTML or plaintext) to be displayed within the SearchSpace. When a user desires to save the post to the SearchSpace, the user may click a save button within the pop-up window. Similarly, a user may edit a pre-existing post by clicking on an edit button and/or link. In this manner, a user may revise a previously entered post title and/or post text.

In some examples, once in a SearchSpace, users may search for information and view, add, edit, delete and/or organize those results and information within the SearchSpace. It should be noted that viewing, adding, editing, deleting and organizing a SearchSpace may include viewing, adding editing, deleting and organizing of information (e.g., search results, links, videos, images, documents, files, posts, notes, annotations, messages, data) associated with the SearchSpace and/or within the SearchSpace. Once in a SearchSpace, a user may view search results 430 and edit search results 430 by clicking Save buttons 470 and/or Hide buttons 480. Further, a user may organize the results 430 by associating specific results with certain folders and/or by annotating or commenting on specific results. Users may have access to a variety of search tools such as web search, video search, image search, book search, reference search and educational search. Some examples may use a modular architecture to allow the addition of any number of search sources. Search modules may use application programming interface(s) (APIs) to obtain results from third party sources or directly access data stores of information.

Figure 5:
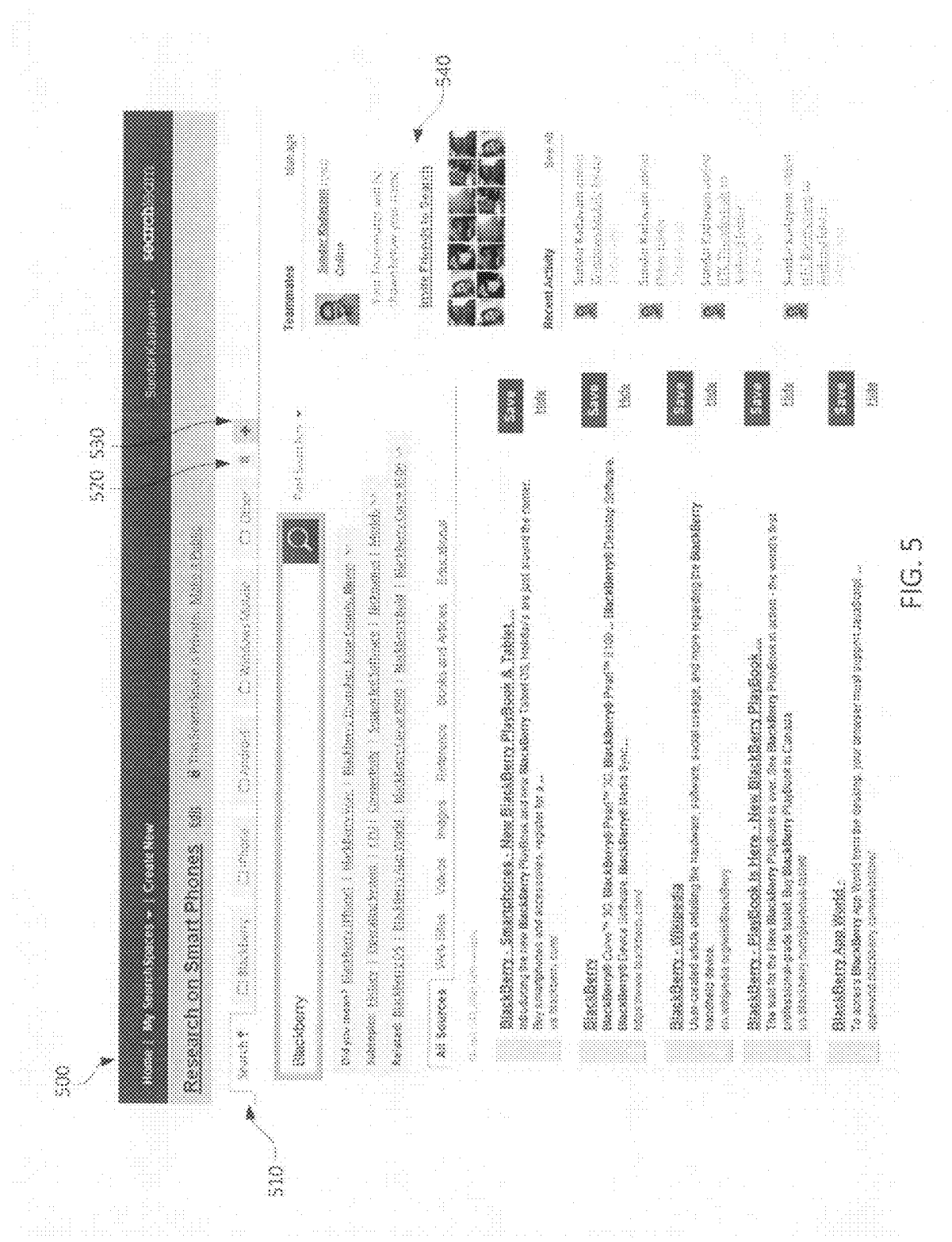

FIG. 5 depicts an example SearchSpace 500 with organized folders. Items can be saved into folders 510 (e.g. BlackBerry, iPhone). Those example folders 510 may be visible to all collaborators and may be used to organize information. In some examples, folders may be deleted by a user clicking or actuating a "delete folder" button 520. In some examples, new folders may be created by a user clicking or actuating an "add folder" button 530. In adding a folder, a pop-up window may request that the user input a folder title and/or folder text. By clicking a save button in the pop-up window, a new folder may be created within the SearchSpace.

A user's ability to view, create, modify, delete and/or otherwise access SearchSpaces (or information associated therewith) is dependent on that user's authorization. Users may include public users, private users, moderators and/or administrator, among others. In some examples, only users given access and/or permission from a SearchSpace creator (or administrator) may access that particular SearchSpace. A SearchSpace creator may give access to all users, including, for example, public users. A SearchSpace creator may give access only to certain users, including, for example, private users. Further, a SearchSpace creator may give only certain rights to the SearchSpace to some users, while giving other users additional or different access rights. For example, a creator of SearchSpace X may give only viewing and creation rights to User A, while giving User B viewing, creation, modification and deletion rights to the same SearchSpace. Even further, the example SearchSpace X may be deemed public, thus allowing viewing right to any third party, including public users. In some examples, a user's right may be requested and/or checked prior to being authorized to access to a SearchSpace.

After a SearchSpace has been created, other users may be invited (e.g., via connections to social networks) thereby bringing other trusted people into the search process. The invitation process may be initiated when a user clicks an Invite button 540. Upon clicking the Invite button 540, a user is prompted to invite other users to join the SearchSpace, as discussed in relation to FIG. 10. This process may allow users to access their various contacts via email or other social systems and invite them to join the search space.

In some examples, once users enter the SearchSpace, those users may be presented with the original SearchSpace and any additions made by the creating user. Changes made by others are visible to the team. In some examples, a series of visual notifications communicate activities (e.g., changes to the SearchSpace) to a user, but can also utilize other methods to let members of the team know of the activities of others.

In some examples, changes made by others may be displayed to all in real-time or near real-time. This allows immediate (or near immediate) notification to all members of a SearchSpace of changes made to the SearchSpace. This keeps all users current and theoretically reduces duplication of effort. Users may also have access to real-time chatting and commenting to communicate directly with other users. In some examples, Comet programming techniques may be used to provide real-time and/or near real-time capabilities within an HTTP based web application. However, other appropriate real-time protocols could be used depending on the platform.

Figure 6:
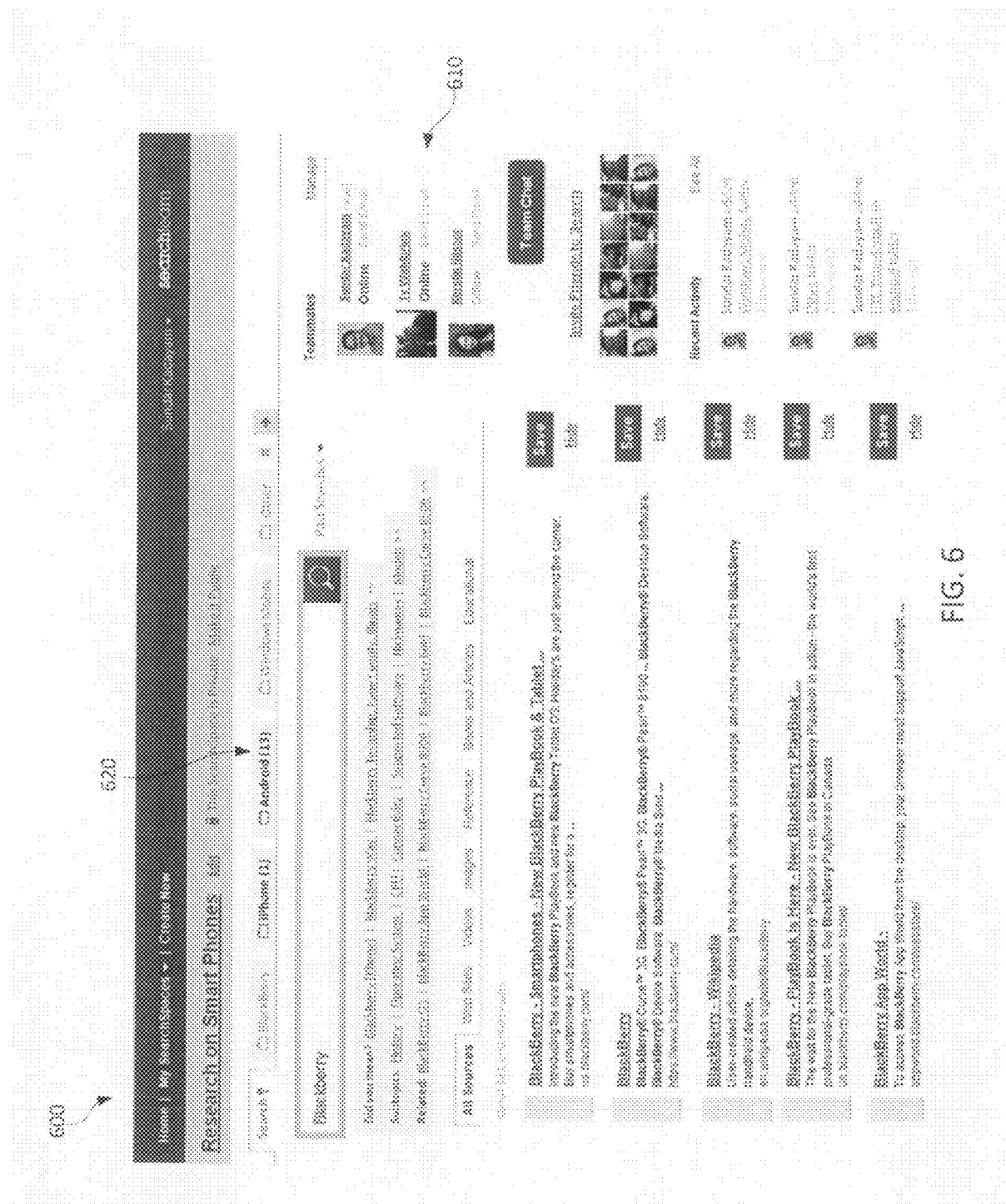

FIG. 6 depicts collaborators 610 after they have been invited and joined an example SearchSpace 600. This includes showing the identity of the collaborators 610 as well as notifications 620 in the folder area notifying others of changes. FIG. 6 depicts three users (e.g., teammates) 610 associated with a SearchSpace 600.

Figure 7:
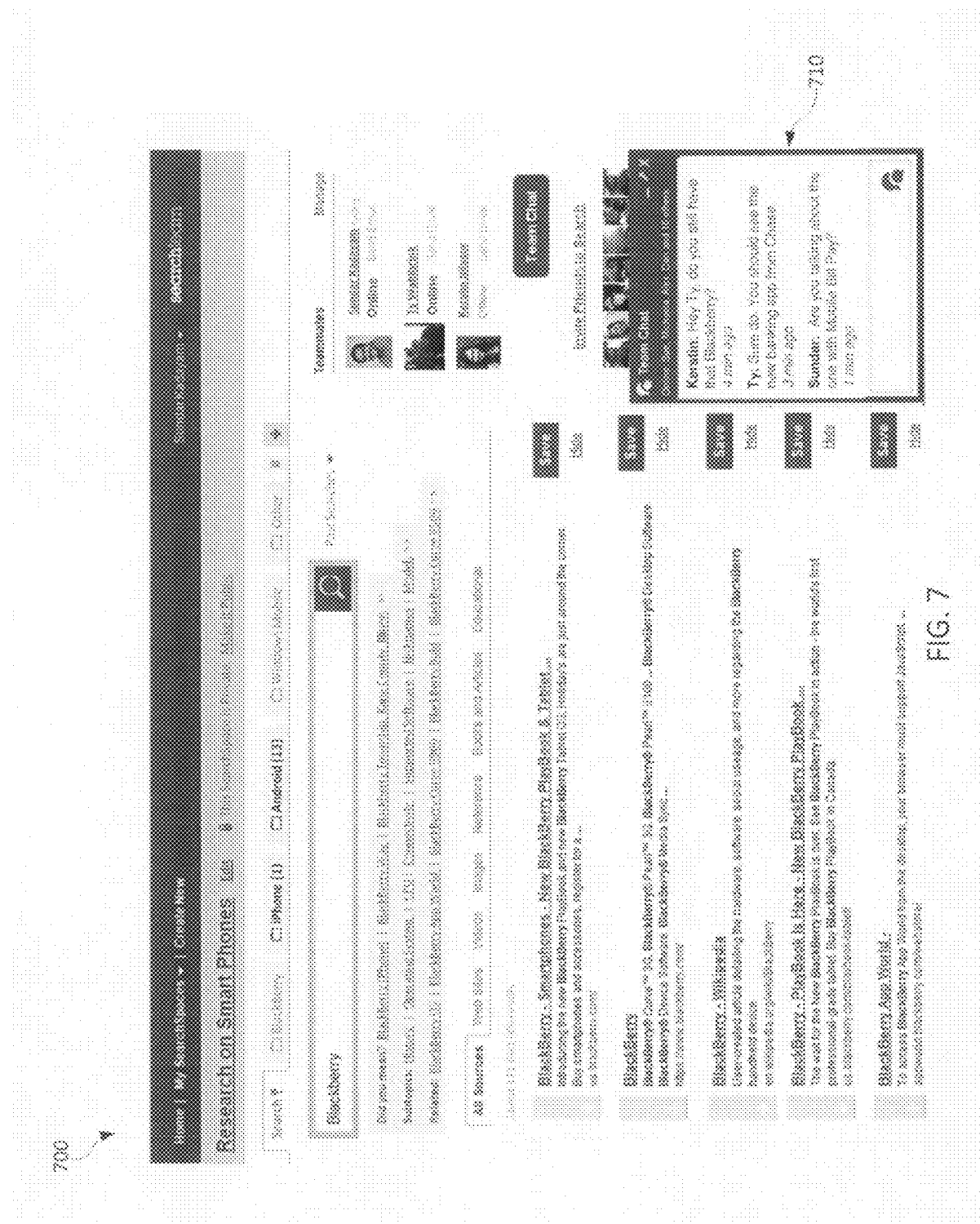

FIG. 7 depicts real-time chat 710 capabilities being used to communicate among collaborators of an example SearchSpace 700. These capabilities may be also be used for offline communication as users will see the chat history 710 when they return to the SearchSpace 700. Users may communicate using real-time chat by entering text in the chat area 710. In some examples, a log of all chat sessions may be saved for future reference. In some examples, any chat activity that took place when a user was not viewing the SearchSpace may be displayed upon that user's return to the SearchSpace. This allows for communication among users regardless of if all users are currently in the SearchSpace.

Figure 8:
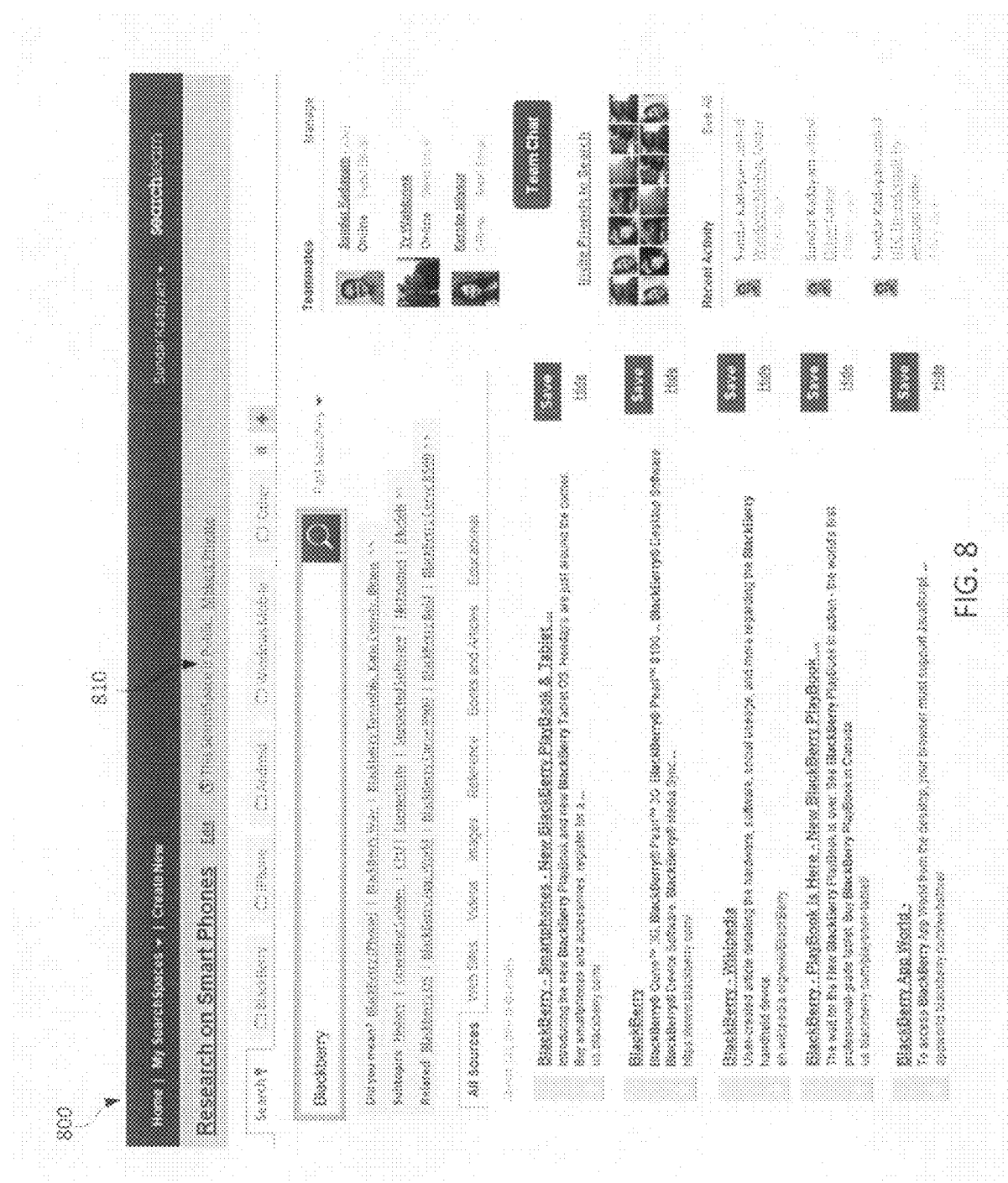

Once a SearchSpace has become adequately refined, it may be published, shared and/or made accessible to others. This may include short-term and/or long-term accessibility by users of a computer network. For example, this may include publication to internal websites for larger teams (such as company intranets) and/or could include publication to websites accessible by the general public. Publication may make the content available via a public URL, a shortened URL, but may also include syndication and/or publication via feeds, email and/or social networking APIs, for example. Example feeds may be formatted and/or configured for publication on blogs and/or websites, for example. This may further include, for example, associating the SearchSpace with one or more social networks. In some examples, verification of a user's permission to access the SearchSpace may be required prior to allowing any access to the user. FIG. 8 depicts an example published SearchSpace 800. Initially, a SearchSpace 800 may be private to the creator and the collaborators, but it may be published (see 810) so a wider audience can view the result of the collaboration. This allows SearchSpaces to be used for public content creation and allows the public (or some subset thereof) to benefit from the results of the collaborations.

In some examples, users may also interact with a SearchSpace via social actions. For example, users may comment on search results. Users may "like" search results to identify the best results. This additional social metadata may be "attached to" or associated with the results in the data store. In some examples, some users (or the public at large) may only be given permission for social actions while collaborators may have full access to the SearchSpace.

In some examples, a public SearchSpace 800 may also allow for publically moderated curation where the public at large may be given some level of access to the SearchSpace 800 to "crowd source" the creation of content using the SearchSpace digital curation system. This may be done in a moderated setting where the SearchSpace creator and/or editors may monitor the SearchSpace 800 and maintain quality. Such moderation may include moderating user comments, annotations, organizations and/or other aspects of a SearchSpace.

FIG. 9 depicts an example SearchSpace folder's contents 900. In some examples, folders may contain items 910 that can be created and/or edited 912 by any collaborator. Comments 920 and "like"s 930 may be attached to or associated with each item 910 having social actions on that item 910. These may include conversations 920 between collaborators and/or other social commentary 920.

In some examples, contacts may be retrieved from email systems such as Yahoo Mail®, Gmail® and/or MSN Hotmail® as well as social systems such as Facebook®, LinkedIn® and/or Twitter®. Other sources of contacts like Microsoft Outlook® may also be used. Furthermore, notifications may include messaging technology to send notifications to users via email or social APIs such as those found in Facebook®, LinkedIn® and/or Twitter®.

Figure 10:
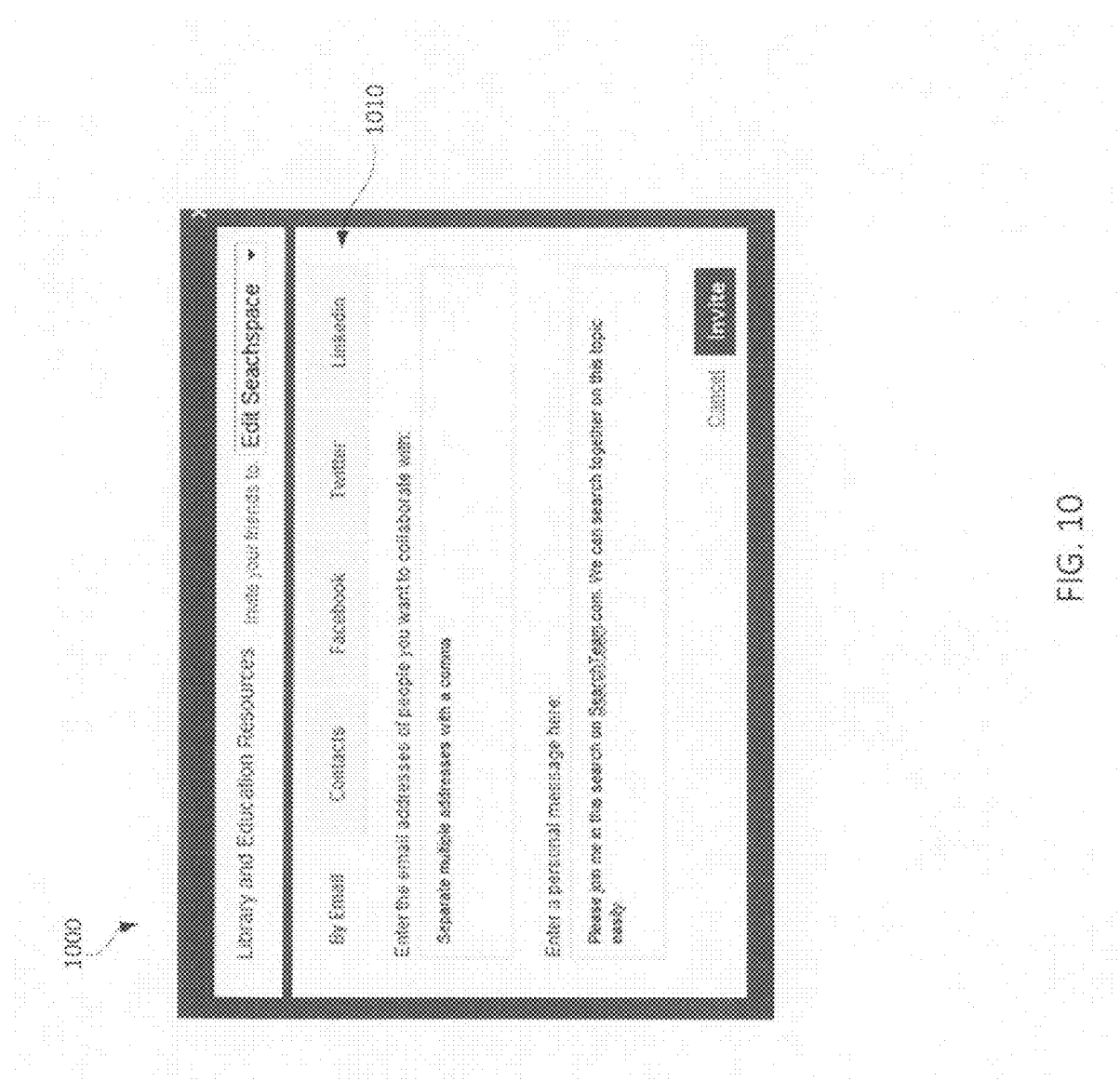

FIG. 10 depicts an example invite dialog 1000 where the SearchSpace creator and/or collaborators may invite others to join an example SearchSpace. The example tabs 1010 may allow others to be invited via email or popular social systems such as Facebook®, Twitter® and/or LinkedIn®.

Figure 11:
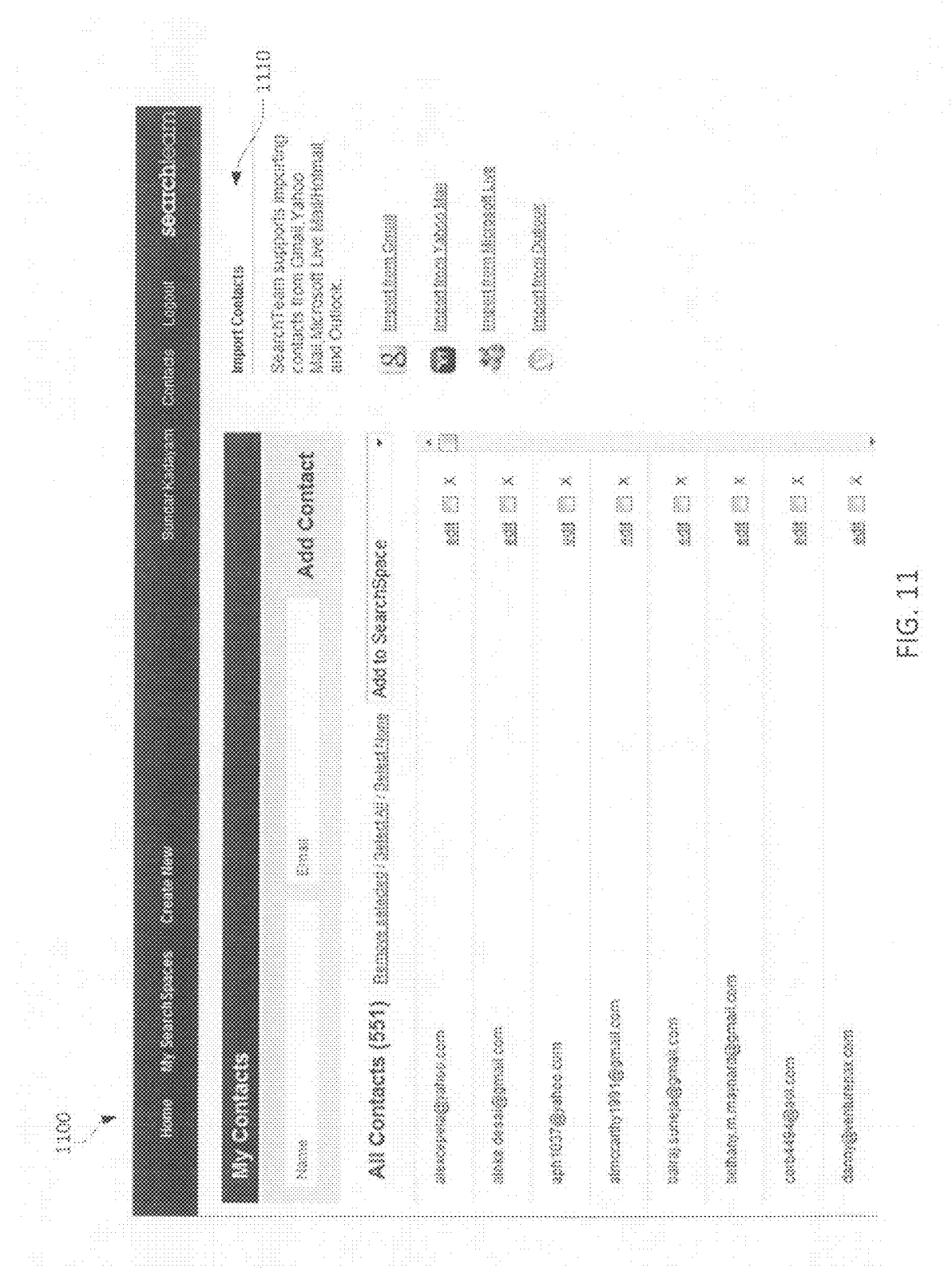

FIG. 11 depicts an example user contacts page 1100 where a user may import contacts (see 1110) from their preferred email system such as GMail®, Yahoo Mail®, Windows Live Mail® and/or Outlook®. This may allow users to leverage their address book with one or more contacts being easily added as a collaborator to a SearchSpace.

Figure 12:
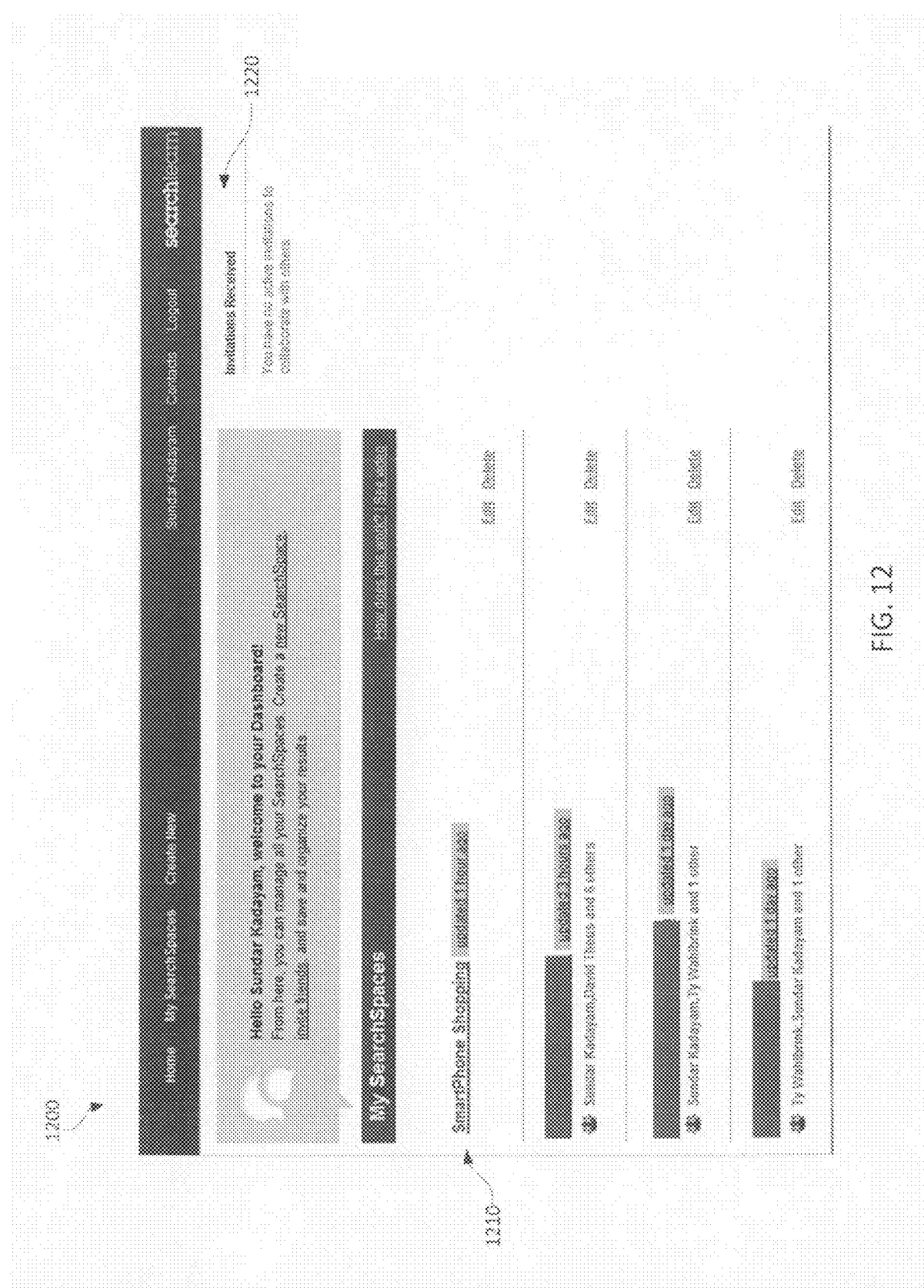

FIG. 12 depicts an example "My SearchSpaces" page 1200 which may function as a dashboard. It may show all SearchSpaces 1210 that a user created and/or joined as a collaborator. It may also show pending invitations (see 1220) to join a SearchSpace. These invitations may also be sent via email and social system notifications (e.g., Facebook® News Feed).

Additionally, SearchSpaces may exist within a hub of users. This may represents a team that may re-engage on any number of SearchSpaces without requiring additional invite processes. This allows teams to continue to easily leverage the members in searching.

In some examples, hubs may be private, accessible through invitation and/or publicly visible. Since hubs may enable real-time and asynchronous collaborative search functionality for trusted user groups (e.g., company workgroups, departments, organizations, associations, interest groups, online communities), they may become repositories of group knowledge on various topics of interest readily. For example, hubs may allow for collaboration by aggregating groups (such as teams) within an organization (such as a corporation).

In some examples, hubs may be implemented as a grouping of SearchSpaces based on a hub ID along with configuration data specifying the members and their roles within the hub.

Figure 13:
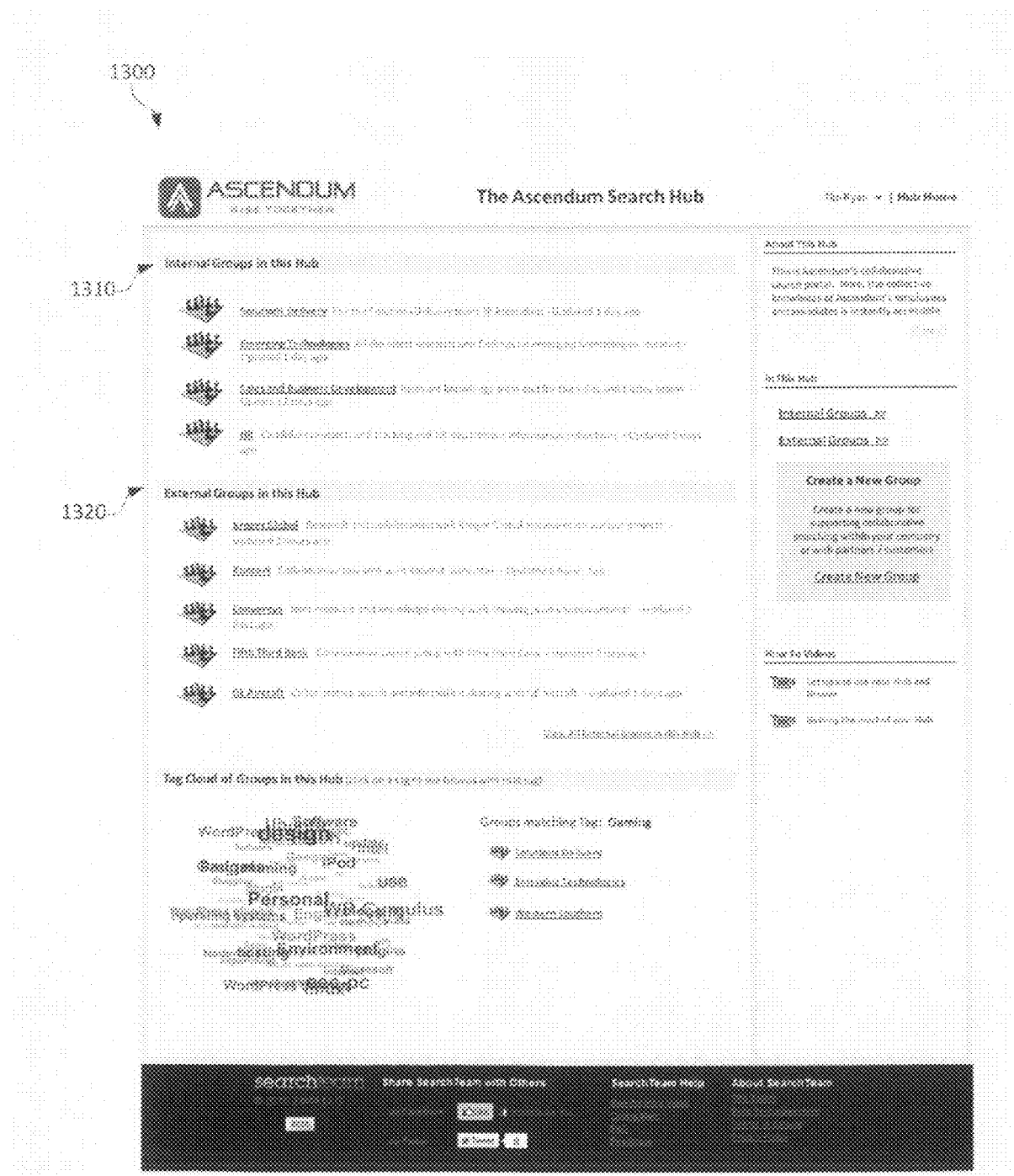

FIG. 13 depicts an example hub page 1300. This example page 1300 lists a number of trusted user groups 1310, 1320 that may be used for collaboration. These may include "internal" groups 1310 as well as "external" groups 1320. This may enable ready discovery of internal communities of interest within an organization and participate in fluid collaboration.

Figure 14:
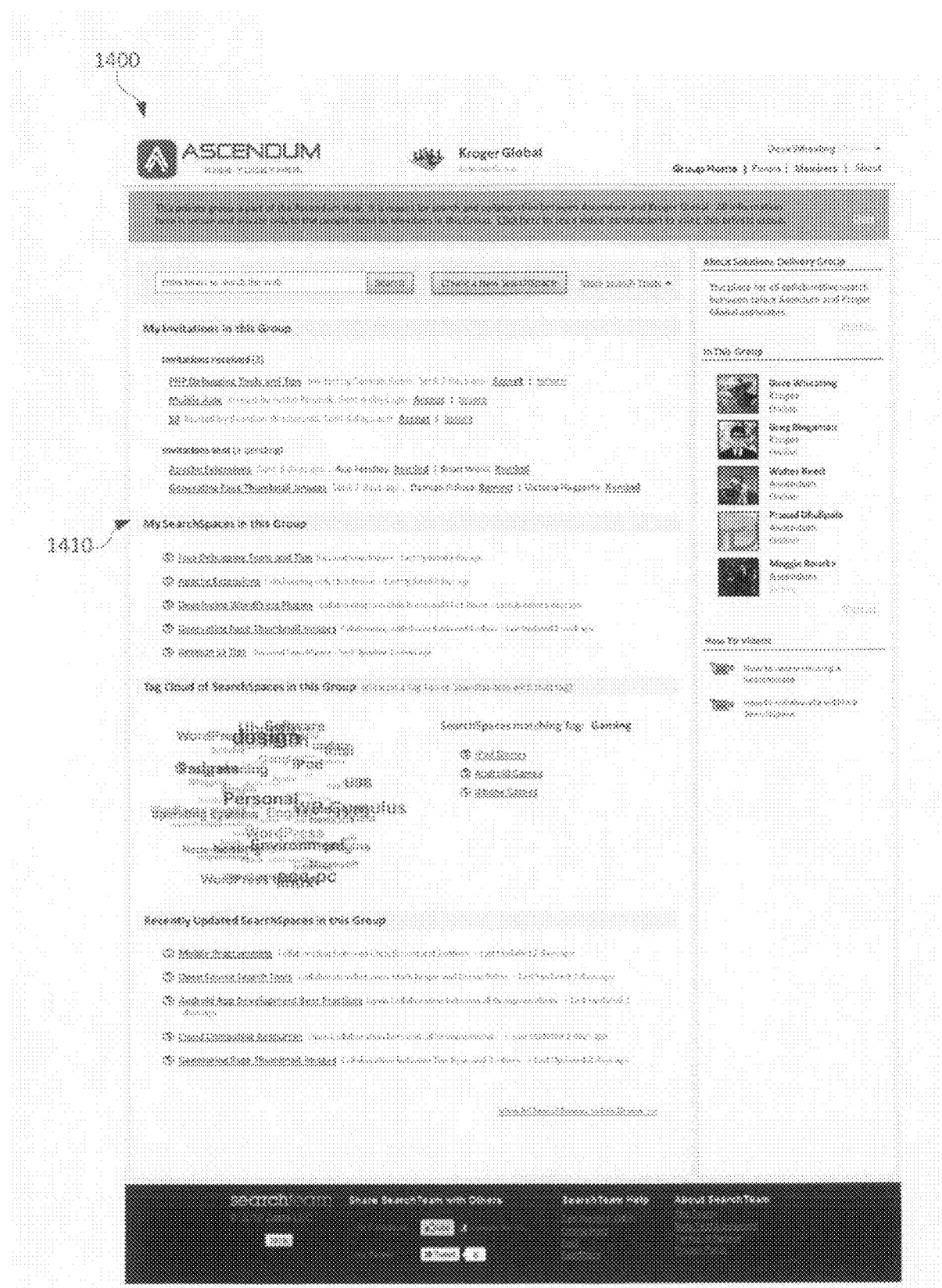

FIG. 14 depicts an example group page 1400. A group may be contained within a hub. Example groups may be private or public, for internal or external use. Example groups may contain SearchSpaces 1410 for more fluid collaboration, knowledge sharing and/or discovery.

In some examples, SearchSpaces may be used in a paid setting where a payment (e.g., a micropayment) may be made for access to a SearchSpace on the topic of interest. Paid SearchSpaces may provide relevant topical content as well as an active collaborative environment to engage an "expert" associated with a topic. Unlike traditional expert reports which are typically only content, a paid SearchSpace may provide the information as consumer ready access to data as well as a system with which to continue to engage the expert to improve the content. In some examples, a topical "expert" may be compensated for sharing previously compiled topical SearchSpaces, compiling topical SearchSpaces upon a user's request, collaborating with a user to in a topical SearchSpace and/or finding useful collaborators for a topical SearchSpace. In some examples, the existence of a topical SearchSpace may be visible to any user (e.g., may show up in search engine results), but access to the topical SearchSpace may be restricted to users willing to pay for access. Access to topical SearchSpaces may also provide access to and collaboration with the "expert" associated with the SearchSpace.

The recent rise of micropayment structures with mobile phones and devices make this use even more compelling where paid SearchSpaces may provide high quality digitally curated data in real-time.

Figure 15:
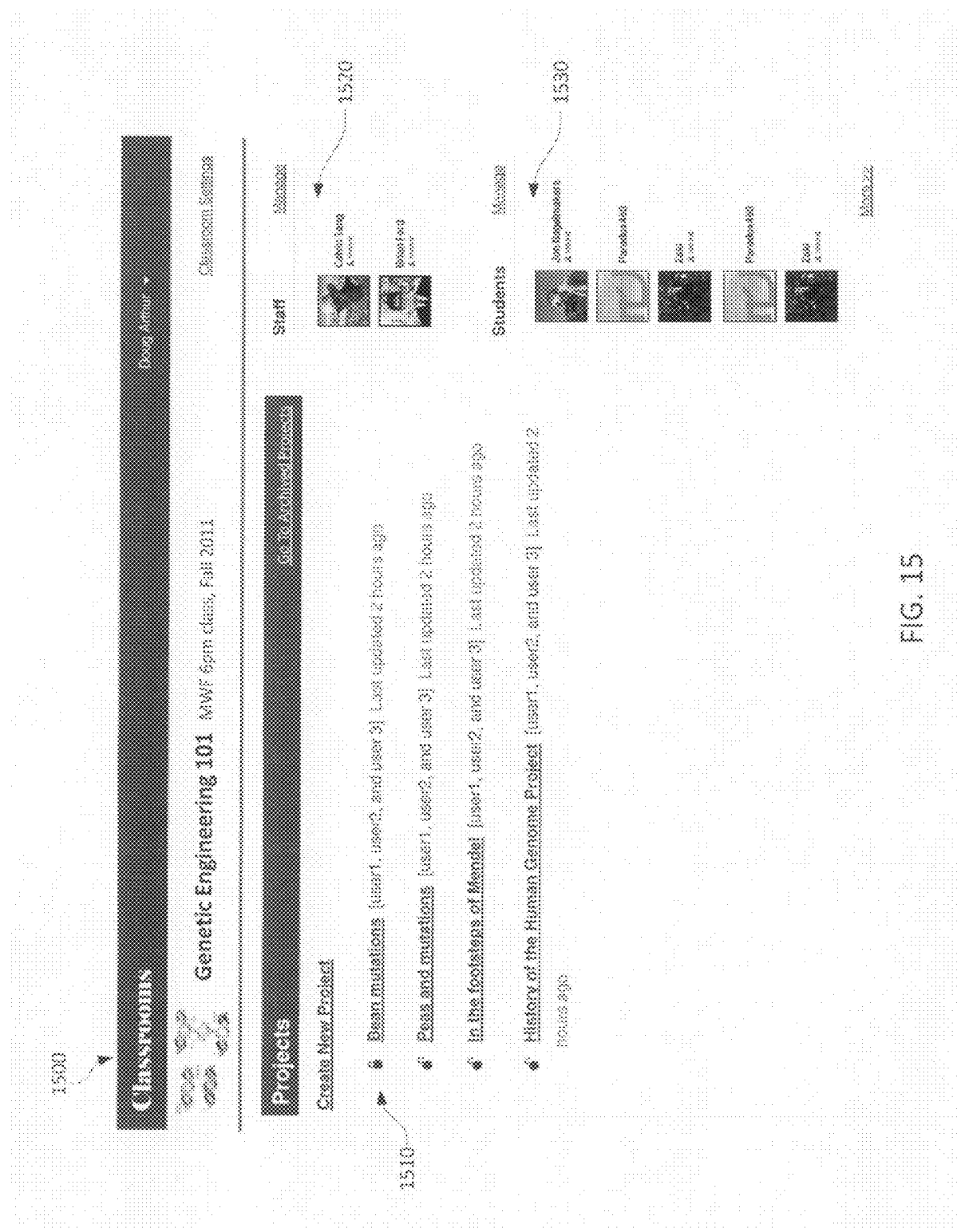

FIG. 15 depicts an example classroom SearchSpace UI 1500 tailored for classroom users. The classroom SearchSpace 1500 may include Projects 1510. For each Project 1510, a different SearchSpace may be created, each SearchSpace pertaining to a Project 1510. Like other examples, the classroom Projects allows collaborative organization and curation of information by multiple users, including school Staff 1520 and Students 1530. In some examples, SearchSpaces may be "skinned" for tailoring to a specific audience. For example, a classroom SearchSpace's user interface may feature less text, more colorful pictures and different terminology than other SearchSpaces (e.g., the use of "Students" instead of "Teammates," "My Classes" instead of "My SearchSpaces"). Other tailored SearchSpaces are also possible, including, for example, an electronic commerce SearchSpace that allows multiple users to collaboratively organize information related to products and/or product categories In an electronic commerce example, a SearchSpace's user interface may be tailored to feature price information, product photographs, product information and different terminology than other SearchSpaces.

Figure 16:
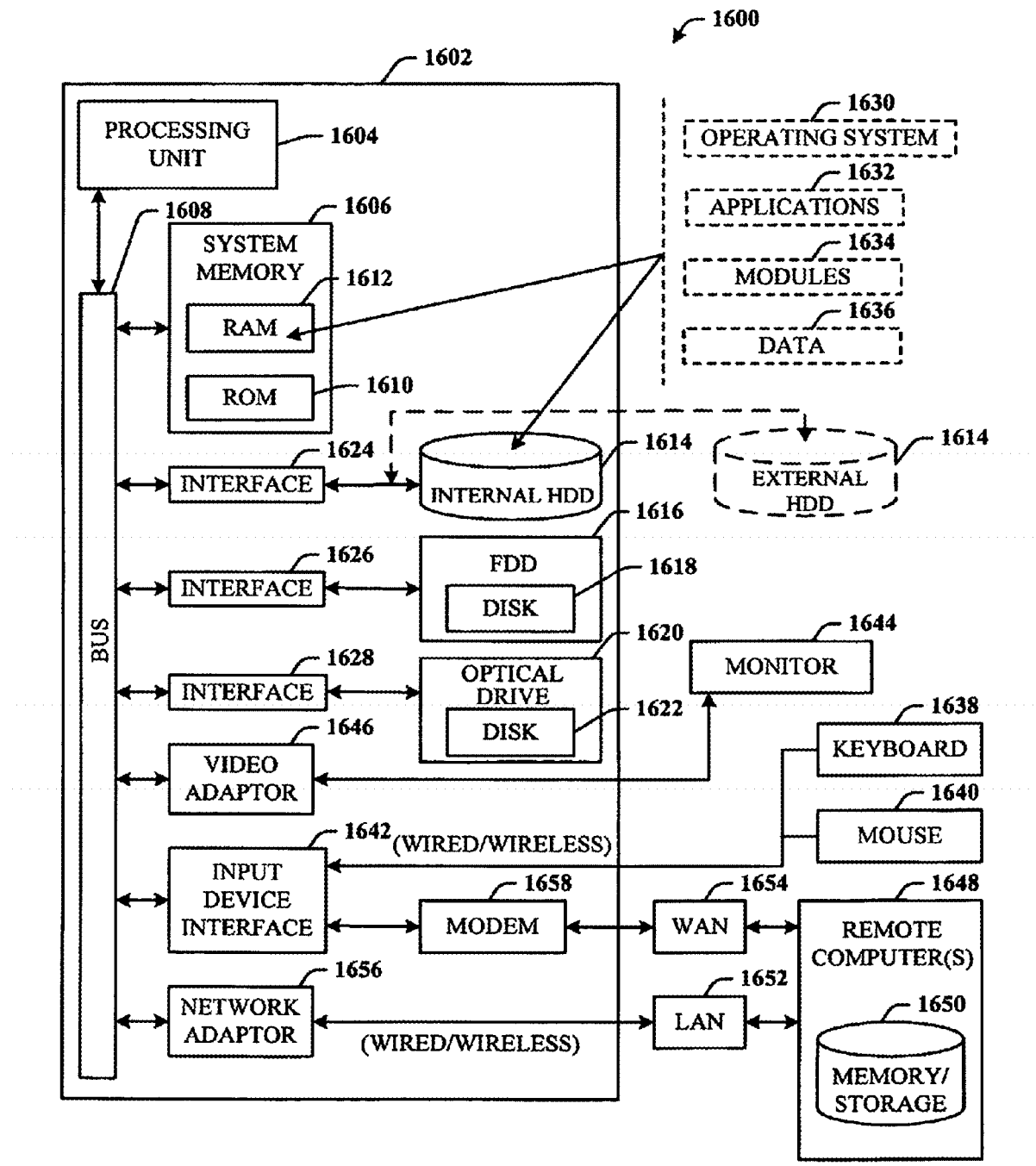
FIG. 16 is a diagram depicting some example computing environments for systems for use in some aspects and examples of collaboratively finding, organizing and/or accessing information, all arranged in accordance with at least some embodiments of the present disclosure.

FIG. 16 illustrates an exemplary environment 1600 for implementing and/or controlling various aspects of an example system that includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of an example system.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that an example system can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1602 is connected to the local network 1652 through a wired and/or wireless communication network interface or adapter 1656. The adaptor 1656 may facilitate wired or wireless communication to the LAN 1652, which may also include a wireless access point disposed thereon for communicating with the wireless adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. One or more non-transitory computer-readable mediums having instructions thereon for causing one or more computers to execute steps for establishing and utilizing a collaborative search portal, the steps comprising:
   receiving a search query over a computer network;
   generating search result data from processing the search query through at least one search engine;
   generating a collaborative search portal associated with the search query;
   receiving one or more instructions, over the computer network, for associating at least one of the search result data with the collaborative search portal;
   associating the at least one of the search result data with the collaborative search portal;
   storing, in one or more storage devices, the collaborative search portal and the associated search result data; and
   organizing the search result data in response to user signals received via the collaborative search portal;
   wherein the instructions are further configured to operate a network accessible computer system to perform the steps of allowing access to the collaborative search portal by one or more user;
   wherein the one or more user comprises one or more public user and one or more authorized portal moderator;
   wherein the one or more public user has permission to display and edit the collaborative search portal; and
   wherein the one or more authorized portal moderator has permission to display, edit and delete one or more edit performed by the one or more public user.

2. One or more non-transitory computer-readable mediums having instructions thereon for causing one or more computers to execute steps for establishing and utilizing a collaborative search portal, the steps comprising:
   receiving a search query over a computer network;
   generating search result data from processing the search query through at least one search engine;
   generating a collaborative search portal associated with the search query;
   receiving one or more instructions, over the computer network, for associating at least one of the search result data with the collaborative search portal;
   associating the at least one of the search result data with the collaborative search portal;
   storing, in one or more storage devices, the collaborative search portal and the associated search result data; and
   organizing the search result data in response to user signals received via the collaborative search portal;
   wherein the instructions are further configured to operate a network accessible computer system to perform the steps of:
   receiving one or more instructions, over the computer network, for associating the collaborative search portal with a social network; and
   associating the collaborative search portal with the social network.

3. One or more non-transitory computer-readable mediums having instructions thereon for causing one or more computers to execute steps for establishing and utilizing a collaborative search portal, the steps comprising:

receiving a search query from a first user over a computer network;

generating search result data from processing the search query through at least one search engine;

generating a collaborative search portal associated with the search query;

receiving one or more instructions from the first user, over the computer network, for associating at least a first one of the search result data with the collaborative search portal;

associating the at least first one of the search result data with the collaborative search portal;

receiving one or more instructions from a second user, over the computer network, for associating at least a second one of the search result data with the collaborative search portal;

associating the at least second one of the search result data with the collaborative search portal; and storing, in one or more storage devices, the collaborative search portal and the associated search result data.

4. The one or more computer-readable mediums having instructions thereon of claim 3, the instructions further configured to operate a network accessible computer system to perform the steps of:

receiving one or more instructions from at least one of the first user and the second user, over the computer network, for generating one or more folders within the collaborative search portal;

generating the one or more folders within the collaborative search portal;

receiving one or more instructions from at least one of the first user and the second user, over the computer network, for associating at least one of the search result data with at least one of the one or more folders; and associating the at least one of the search result data with at least one of the one or more folders.

5. The one or more computer-readable mediums having instructions thereon of claim 3, the instructions further configured to operate a network accessible computer system to perform the steps of:

receiving one or more instructions from a third party, over the computer network, for access to the collaborative search portal; and prior to allowing access to the collaborative search portal by the third party, receiving a payment from the third party.

6. The one or more computer-readable mediums having instructions thereon of claim 3, receiving one or more instructions from a third party, over the computer network, for access to the collaborative search portal and one or more topical expert associated with the collaborative search portal; and prior to allowing access to the collaborative search portal and the one or more topical expert associated with the collaborative search portal by the third party, receiving a payment from the third party.

* * * * *